(12) United States Patent
Raj Seeniraj et al.

(10) Patent No.: US 8,683,466 B2
(45) Date of Patent: Mar. 25, 2014

(54) SYSTEM AND METHOD FOR GENERATING A VIRTUAL DESKTOP

(75) Inventors: Sam Arun Raj Seeniraj, Bangalore (IN); Neeraj Sanjeev Kulkarni, Pune (IN); Sriranga Seetharamaiah, Mysore (IN)

(73) Assignee: VMware, Inc., Palo Alto, CA (US)

( * ) Notice: Subject to any disclaimer, the term of this patent is extended or adjusted under 35 U.S.C. 154(b) by 359 days.

(21) Appl. No.: 13/114,847

(22) Filed: May 24, 2011

(65) Prior Publication Data
US 2012/0304168 A1 Nov. 29, 2012

(51) Int. Cl.
G06F 9/455 (2006.01)

(52) U.S. Cl.
USPC ............................................................. 718/1

(58) Field of Classification Search
None
See application file for complete search history.

(56) References Cited

U.S. PATENT DOCUMENTS

| | | | |
|---|---|---|---|
| 7,856,440 B2 * | 12/2010 | Alpern et al. | 707/756 |
| 7,987,432 B1 * | 7/2011 | Grechishkin et al. | 715/778 |
| 8,112,505 B1 * | 2/2012 | Ben-Shaul et al. | 709/219 |
| 8,307,187 B2 * | 11/2012 | Chawla et al. | 711/173 |
| 8,392,838 B2 * | 3/2013 | Chawla et al. | 715/748 |
| 8,434,081 B2 * | 4/2013 | Cervantes et al. | 718/1 |
| 2009/0070752 A1 * | 3/2009 | Alpern et al. | 717/148 |
| 2009/0222462 A1 * | 9/2009 | Alpern et al. | 707/100 |
| 2009/0313447 A1 * | 12/2009 | Nguyen et al. | 711/162 |
| 2010/0036889 A1 | 2/2010 | Joshi et al. | |
| 2010/0037041 A1 | 2/2010 | Joshi et al. | |
| 2010/0088328 A1 | 4/2010 | Joshi et al. | |
| 2010/0211663 A1 * | 8/2010 | Barboy et al. | 709/223 |
| 2010/0241654 A1 * | 9/2010 | Wu et al. | 707/769 |
| 2010/0254622 A1 * | 10/2010 | Kamay et al. | 382/239 |
| 2011/0107331 A1 * | 5/2011 | Evans et al. | 718/1 |

OTHER PUBLICATIONS

Oppenheimer, Priscilla. "New Technologies File System (NTFS)," 2008 (available at: http://www.priscilla.com/Courses/ComputerForensics/pdfslides/03-NTFSConcepts.pdf).
PCguide.com, "New Technology File System (NTFS)," Jun. 2, 2002 (available at: http://replay.waybackmachine.org/20020602022713/http://www.pcguide.com/ref/hdd/file/ntfs/).
Wikipedia, "NTFS," Feb. 9, 2009 (available at: http://replay.waybackmachine.org/20090209001710/http://en.wikipedia.org/wiki/Ntfs).
Tuxera, "NTFS-3G Manual," Version 2011.1.15, released Jan. 23, 2011 (available at: http://www.tuxera.com/community/ntfs-3g-manual/).
Madden, Brian. "A deeper look at VMware's upcoming 'View Composer' VDI disk image technology (i.e., multiple VMs sharing the same disk image)," Oct. 13, 2008 (available at: http://www.brianmadden.com/blogs/brianmadden/archive/2008/10/13/a-deeper-look-at-vmware-s-upcoming-quot-view-composer-quot-vdi-disk-image-technology-i-e-multiple-vms-sharing-the-same-disk-image.aspx).

(Continued)

*Primary Examiner* — Van Nguyen

(57) ABSTRACT

A technique for composing a virtual desktop associated with one or more applications in a virtualized computing environment. The technique includes generating file system level metadata in the desktop image for applications that create a perception that data blocks in the desktop image have been allocated to applications, but not actually copying any of the application data into the allocated blocks. Instead, the technique builds a mapping table between disk block numbers and the application data, which can be stored in a separate application store. The disclosed techniques provide a more efficient way to compose a virtual desktop, compared to current virtual desktop adoption techniques.

14 Claims, 7 Drawing Sheets

(56) References Cited

OTHER PUBLICATIONS

Madden, Brian. "Brian Dump: Atlantis Computing hopes to solve the 'file-based' versus 'block-based' VDI disk image challenge," Feb. 18, 2009 (available at: http://www.brianmadden.com/blogs/brianmadden/archive/2009/02/18/brian-dump-atlantis-computing-hopes-to-solve-the-quot-file-based-quot-versus-quot-block-based-quot-vdi-disk-image-challenge.aspx).

Pfaff, et al. "Virtualization Aware File Systems: Getting Beyond the Limitations of Virtual Disks," Stanford University Department of Comp. Sci., 3rd Symposium on Networked Systems Design and Implementation, May 2006 (available at: http://benpfaff.org/papers/ventana.pdf).

Unidesk Corp., "The Management Platform for Broader VMware View Adoption," Unidesk Quick Brief for VMware View, 2010.

* cited by examiner

SYSTEM AND METHOD FOR GENERATING A VIRTUAL DESKTOP

BACKGROUND

Computer virtualization is a technique that involves abstracting a physical computing machine platform into a virtual machine that is executed under the control of virtualization software running on a single hardware computing platform (also referred to herein as a "host system" or a "host computer"). A group of hardware computing platforms may be organized as a cluster to provide the hardware resources for virtual machines. In a server or data center that employs virtual machines, it is common to see hundreds, even thousands, of virtual machines running on multiple clusters of host systems.

For ease of deployment, software management, and hardware cost reduction reasons, virtual machines have been used to support virtual desktops for use in an organization in place of physical workstations. In such environments, a virtual desktop is delivered in the form of one or more "delta disks" layered on top of a master image, or "golden image." Typically, the operating system is made read-only and is encapsulated in the master image. The same master image is delivered to all users, i.e., to each virtual machine (VM). Applications and settings for each user are installed in the one or more delta disks that are layered on top of the master image.

However, this approach is associated with several drawbacks. First, if the master image is updated with patches, then the delta disks layered on top of the patched master image would not function properly since the delta disks are dependent on the master image. Accordingly, new delta disks would need to be created for each VM each time the master image is updated. A second problem is that when many applications and settings are incorporated into the delta disks, the size of the delta disks can be quite large. Managing large delta disks can be time-consuming and cumbersome for an administrator.

Accordingly, there remains a need for a system and method for managing virtual desktops that overcomes the drawbacks discussed above.

SUMMARY

One or more embodiments provide a method for generating a desktop image for a client computing device. The method includes receiving a selection of one or more applications to include in the desktop image; determining references to application containers associated with each of the one or more applications, where the application containers are stored in a storage system accessible by a hypervisor running a virtual machine accessing the desktop image; modifying metadata in a file system associated with the disk image to indicate that application data associated with the one or more applications is stored in a number of data blocks of the file system, but not copying the application data into the number of data blocks of the file system; generating a mapping between the number of data blocks of the file system and the references to the application containers; and enabling access to the mapping by the hypervisor when running the virtual machine.

Another embodiment provides a method for accessing a file of a virtual desktop for a client computing device. The method includes receiving a read request to a data block from a file system driver of the virtual desktop; determining whether the data block is stored in a desktop image or in an application container; when the data block is stored in the application container, translating the read request based on information stored in a mapping table and causing the data block to be accessed from the application container; and when the data block is stored in the desktop image, causing the data block to be accessed from the desktop image.

DETAILED DESCRIPTION

Figure 1A:
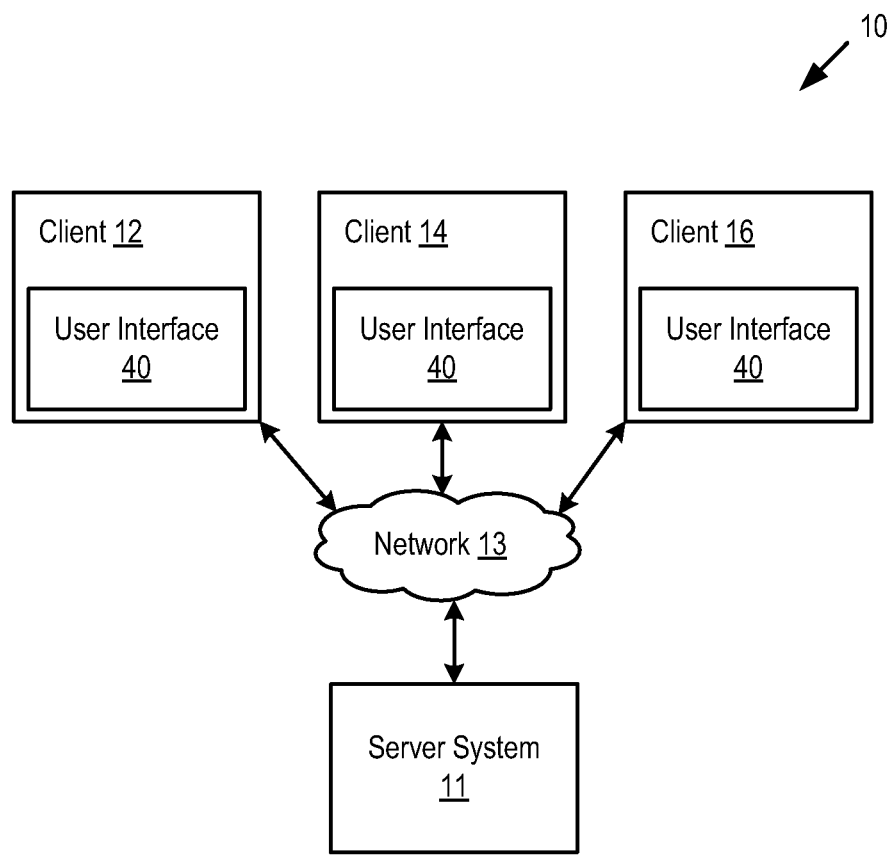
FIG. 1A illustrates a virtual desktop infrastructure (VDI) system in which one or more embodiments may be practiced.

FIG. 1A illustrates a virtual desktop infrastructure (VDI) system 10 in which one or more embodiments may be practiced. The term, "desktop" refers to a human interface environment through which users can launch, interact with, and manage the user's applications, settings, and data. Traditionally, a desktop is presented by an operating system on a video display, and a user interacts with the desktop using a mouse and keyboard. Applications, documents, and other files may be displayed on the desktop and user input can be received by applications visible to the user on the display. The term "desktop" is also known to be used to refer to a physical computer system or "physical desktop" that might be placed on or near a user's desk, which is distinct from a "laptop" or "palmtop," but as used herein, the term "desktop" by itself refers to the human interface environment described above, and not a physical computer system. Using computer virtualization, a user's computer system, including operating system settings, applications and application settings, and data may be transferred or copied as a virtual machine from one physical computer to another. When a virtual machine is copied in this way, the user can access his or her "desktop" from the physical computer system containing the original virtual machine, or the physical computer system containing the copy. The "desktop," therefore, is no longer tied to a particular physical computer system.

VDI system 10 includes VDI server system 11 in data communication over network 13 with several VDI client systems 12, 14, and 16. Network 13 may be any configuration, such as a local area network (LAN), or private or publicly accessible wide area network (WAN), such as the Internet. It should be recognized that FIG. 1A shows a simplified representation of a typical VDI network server system 11, which may include other components such as firewalls, connection brokers, and load balancers, as well as back-end storage networks, database servers, among others, as described in greater detail in FIG. 1B. Each client system 12, 14, 16 may include a user interface 40 through which a user can interact with his or her desktop.

Figure 1B:
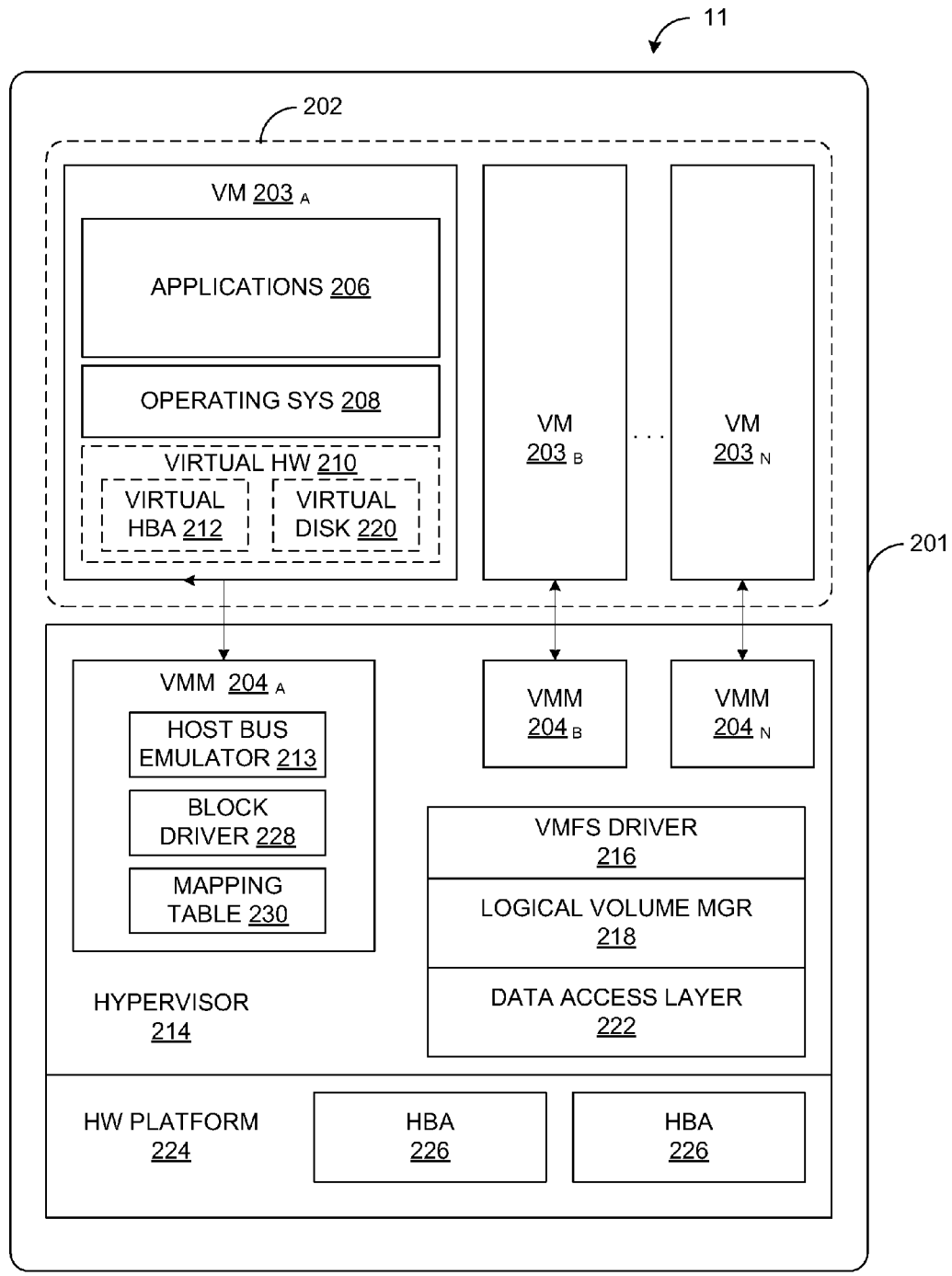
FIG. 1B is a block diagram illustrating a VM-based system in which one or more embodiments can be practiced.

FIG. 1B is a block diagram illustrating a VM-based system in which one or more embodiments can be practiced. Server system 11 includes an integral computer system 201 constructed on a conventional, typically server-class hardware platform 224, including host bus adapters (HBAs) 226 in addition to a conventional platform processor, memory, and other standard peripheral components (not separately shown). Hardware platform 224 executes a hypervisor 214 supporting a virtual machine execution space 202 within which virtual machines (VMs) 203$_{A-N}$ are executed. In one or more embodiments, hypervisor 214 and virtual machines 203$_{A-N}$ are implemented using the vSphere™ product developed and distributed by VMware, Inc.

Hypervisor 214 provides services and support to enable concurrent execution of virtual machines 203$_{A-N}$. In turn, each virtual machine 203$_{A-N}$ implements a virtual hardware platform 210 as a conceptual layer that supports the execution of a guest operating system 208 and one or more client applications 206 (which may be encapsulated in "application containers," as further discussed below). In one or more embodiments, the guest operating systems 208 are instances of Microsoft® Windows®, Linux, or Netware-based operating systems, or the like. Other guest operating systems can be equivalently used. In each instance, guest operating system 208 includes a native file system layer, typically either an NTFS (New Technology File System) or a ext3 (third extended) file system file system layer. These file system layers interface with the virtual hardware platforms 210 to access, from the perspective of guest operating systems 208, a data storage host bus adapter. In one implementation, virtual hardware platform 210 implements a virtual host bus adapter 212 and a virtual disk 220 that emulate the necessary system hardware support to enable execution of the guest operating system 208 transparently to the virtualization of the system hardware.

File system calls initiated by guest operating system 208 to perform file system-related data transfer and control operations on virtual disk 220 are processed and passed through the virtual host bus adapter 212 to adjunct a virtual machine monitor (VMM) layer 204$_A$ that implements the virtual system support necessary to coordinate operation with the hypervisor 214. In particular, a host bus emulator 213 functionally in VMM 204$_A$ enables the data transfer and control operations to be ultimately passed to the host bus adapters 226. As further depicted in the embodiment of FIG. 1B, VMM 204$_A$ also includes a block driver 228 and accesses a mapping table 230 to assist VMM 204$_A$ in determining a storage location of data requested by the file system calls from guest operating system 208. For example, upon receiving a file system block level request to read data, host bus emulator 213 may request block driver 228 to determine whether the requested file blocks match an entry in mapping table 230. If mapping table 230 includes such an entry, then block driver 228 re-directs the file system block level request to a location specified in the entry of the mapping table 230 rather than allowing the file system block level request to be satisfied by a storage location of virtual disk 220, itself, as would typically occur. In either case, file system calls for performing data transfer and control operations generated, for example, by applications 206 are translated and passed to a virtual machine file system (VMFS) driver or component 216 that manages access to files (e.g., virtual disks, etc.) stored in data storage systems networked with server system 11 that may be accessed by any of the virtual machines 203$_{A-N}$.

For example, guest operating systems 208 can receive file system calls and perform corresponding command and data transfer operations against virtual disks, such as virtual SCSI (Small Computer System Interface) devices accessible through virtual HBA 212, that are visible to the guest operating systems 208 (e.g., as a virtual disk 220, etc.). These virtual disks 220 are maintained as files stored on a VMFS, for example, in a storage system networked to the server 11. Each such virtual disk 220 may be maintained as a file or set of files stored on a VMFS, for example, in the networked storage system. Guest operating system 208 file system calls are translated from instructions applicable to virtual disk 220, which is visible to the guest operating system 208, to instructions applicable to a file representing virtual disk 220 in the networked storage system exposed by a storage system manager to the VMFS. Such translations are performed through a number of component layers of an IO (input/output) stack, beginning at the guest operating system 208 (which receives the file system calls from applications 206), through virtual HBA 212, host bus emulator 213, block driver 228, VMFS driver 216, a logical volume manager 218, which assists VMFS driver 216 with mapping files stored in the VMFS with the storage system exposed by the storage system manager, a data access layer 222, including device drivers, and host bus adapters 226 (which, for example, issue a SCSI command to the storage system manager to access storage system).

It should be recognized that the various terms, layers, and categorizations used to describe the virtualization components in FIG. 1B may be referred to differently without departing from their functionality or the spirit or scope of embodiments described herein. For example, while block driver 228 and mapping table 230 have been depicted as part of VMM 204$_A$, it should be recognized that alternative embodiments may implement block driver 228 as part of a different component of hypervisor 214. Furthermore, while one embodiment may implement a mapping table 230 for each corresponding virtual disk 220, alternative embodiments may utilize a global mapping table that includes mappings for all virtual disks. Similarly, it should be recognized that while VMMs 204$_{A-N}$ may be considered separate virtualization components between VMs 203$_{A-N}$ and hypervisor 214 (which, in such an embodiment, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative embodiment, for example, the conceptual layer described as virtual hardware platform 210 may be merged with and into VMMs 204$_{A-N}$ such that virtual host bus adapter 212 is removed from FIG. 1B (i.e., since its functionality is effectuated by host bus adapter emulator 213).

Embodiments herein provide a technique to compose virtual desktops having one or more applications in a virtualized computing environment, yet retain the ability to apply changes to each component of the virtual desktop independent of the other components. Embodiments solve the efficiency issues of current VDI adoption techniques, for example, by populating metadata of a guest file system by making new file entries and allocating blocks for the new files, but not actually copying any of the file data into the allocated blocks. Instead, embodiments build a mapping table (e.g., such as mapping table 230 for virtual disk 220) between file system block numbers and the actual data, which can be stored in a separate storage location, storage system or storage array.

At the hypervisor level, the block driver 228 monitors for block read requests that fall into the mapping table 230. If a block read request falls into one of the mappings in the mapping table 230, hypervisor 214 redirects the block read request to an external data storage/source that stores the requested data and then passes the data back to the file system implementation requesting the data.

In one embodiment, applications 206 that are to be delivered via the virtual desktop are encapsulated in application containers. An application container is a data structure that captures an application in an OS-neutral format. In one embodiment, the ThinApp™ program provided by VMware Inc. can be used to generate such application containers. In one implementation for generating such application containers, a standard operating system is scanned as a reference point. The scanning process scans the registry and the file system and generates a list of all the components that are present. Then, the application that is being captured into the application container is installed onto the standard operating system. The installation adds one or more files and makes one or more registry changes to the system. Once the application is completely installed, a post-installation scan of the system is performed and a second list is generated that includes the new additions to the system caused by the installation. Differences in the files and registry changes (and any other changes) between the pre-installation scan list and the post-installation scan list are determined. The resulting files (including an executable of the actual application itself) and registry entries are then stored in an "application container" that may further contain a runtime component and that is itself stored, for example, within a virtual disk of a user's virtual desktop, and that serves as the executable file for the application.

When the user launches the application container (e.g., from the file system of the guest OS of the virtual desktop), the runtime component of the application container executes the code of the application itself (which is embedded in the application container, as previously discussed) and intercepts and redirects any requests by the application code to access registry values and/or files back into the application container itself, to the extent such registry values and/or files were stored in application container, as previously discussed. Because applications captured in such OS-neutral application containers are self-contained, they can be updated (e.g., replaced with a new version of the application, etc.) in a virtual desktop image without interfering with other components of the virtual desktop, enabling such application containers in the virtual desktop to be updated more efficiently, as described in greater detail herein. It should be recognized however, that although embodiments herein utilize and refer to such application containers, alternative embodiments may utilize traditional applications rather than such application containers.

Embodiments involve generating a virtual desktop that includes an OS (operating system), which can be stored in an "OS store," and one or more applications, which can be stored in an "application store," for example, to be accessed by virtual desktops in the form of application containers. In one embodiment, the OS store and/or the application store are locations in networked storage accessible by server 11 that respectively store a number of OS images or application containers that can be selected by an administrator or other user when generating a virtual desktop (e.g., sometimes also referred to as a blob (binary large object) store).

A virtual desktop management application generates virtual desktop by generating metadata for use by the file system of virtual desktop (e.g., file descriptors of application containers accessible by the file system of the guest OS, etc.) that, for example, provide data block addresses of virtual disk 220 that purportedly store the application data. Along with the metadata, the virtual desktop management application further creates a mapping table 230 for virtual desktop for use by hypervisor 214 that maps the data block addresses that purportedly contain the application data in virtual disk 220 to the actual location of data blocks of the application data, which may be stored in different location (e.g., the application container in the application store, etc.) of a networked storage system.

During running of the virtual desktop in a VM 203, when guest OS 208 attempts to access data that has been re-mapped to a networked storage location rather than the actual file representing virtual disk 220 itself, hypervisor 214 satisfies the request by fetching the data from the application container residing in the application store rather than from the file representing virtual disk 220 itself (which does not include the application container). Upon receiving a read request for data that is stored within an application container from guest OS 208, block driver 228 in hypervisor 214, in one embodiment, performs a lookup in mapping table 230, as further described below, to determine a location of (and offset within) the application container in the application store in order to access the data, thus avoiding any need to add any application data to the actual file of virtual disk 220 of the virtual desktop, as previously required.

Embodiments have two distinct phases—an offline phase and a runtime phase. The offline phase involves execution of the virtual desktop management application (as previously discussed) that generates a composition of the virtual desktop, and the runtime phase involves the translation of read requests received by hypervisor 214 to a proper location in a networked storage system (e.g., other than virtual disk 220 associated with the running virtual desktop of the runtime phase). In one embodiment, such a virtual desktop management application is executed by a processor, which may comprise a processor included in the computer system 201. In other embodiments, the virtual desktop management application is included within a virtual machine 203 running within the computer system 201.

Figure 2:
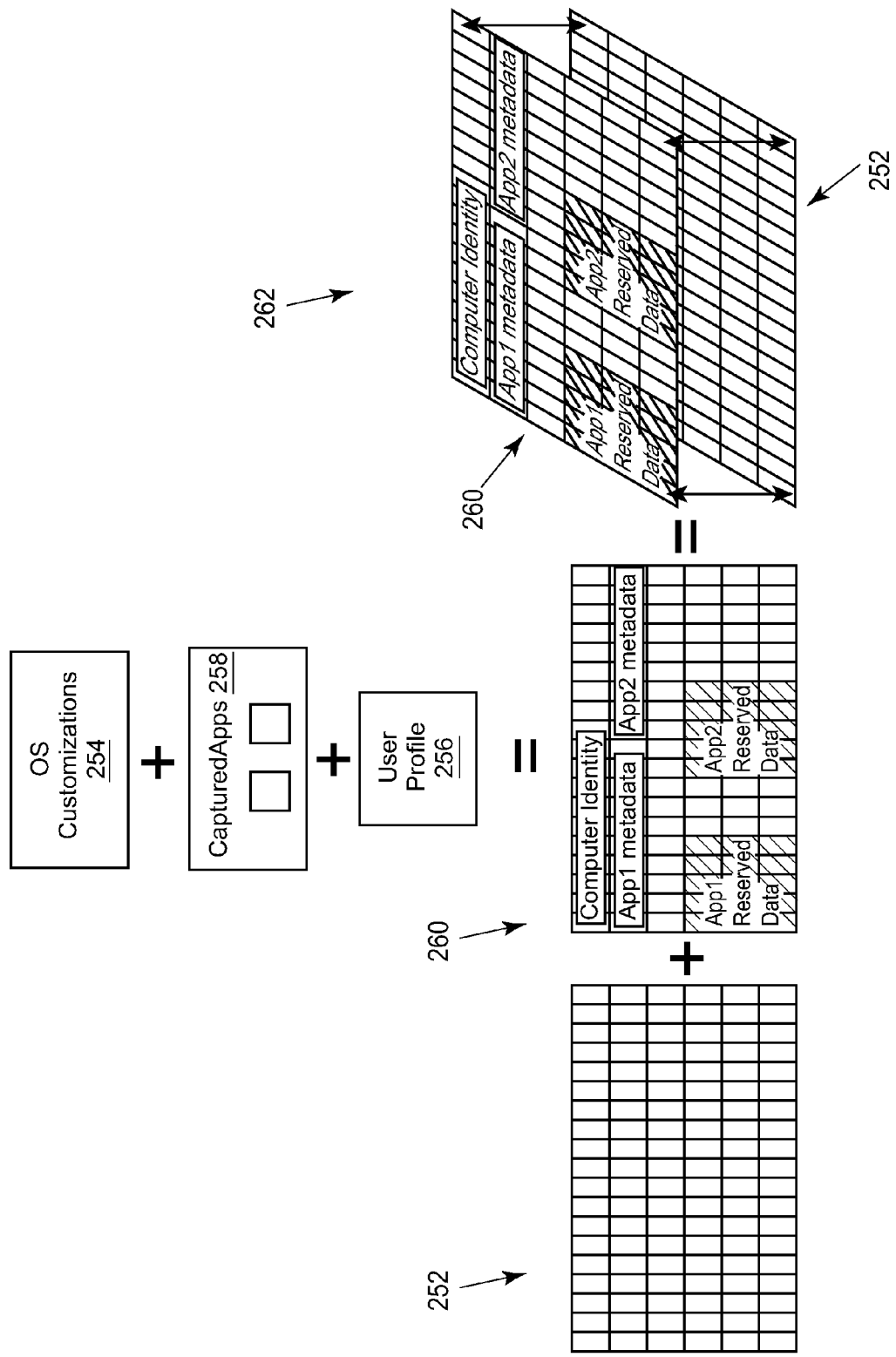
FIG. 2 is a conceptual diagram of offline desktop composition, according to one embodiment.

FIG. 2 is a conceptual diagram of offline desktop composition, according to one embodiment. A virtual desktop management application can be configured to generate a virtual disk 220 that provides a desktop image 262 that includes a primary virtual disk 252 and an applications portion 260. In one embodiment, as previously discussed, the virtual desktop management application receives a selected master OS image from an OS store and generates primary virtual disk 252 of desktop image 262 as a read-only layer that references the master OS image in the OS storage. In such an embodiment, applications portion 260 may be layered on top of the read-only primary virtual disk 252 (e.g., as a "delta-disk") to provide desktop image 262 access to one or more applications and customizations. It should be recognized however, that alternative embodiments may implement desktop image 262 in a variety of ways. For example, primary virtual disk 252 may be fully cloned or copied from the OS store and applications portion 260 may be combined with primary virtual disk 252 in a single primary virtual disk rather than as a delta disk.

Virtual desktop management application may add relevant OS customizations 254 to applications portion 260 if, for example, specific settings that are required by a particular group within an organization for which the virtual desktop is being generated. The virtual desktop management application may also receive user-specific configuration information 256, such as profile information, and add such user-specific configuration information to applications portion 260. The virtual desktop management application further generates a computer identity based on the OS customizations 254 and the user-specific configuration information 256 and adds the computer identity to applications portion 260. In an alternative embodiment, the computer identity information (i.e., which may be based on the OS customizations 254 and the user-specific configuration information 256) may be combined with the primary virtual disk 252 in a single primary virtual disk, rather than being part of the applications portion 260.

The virtual desktop management application may also receive one or more captured applications 258 to be included in the virtual desktop. As previously described, such captured applications 258 can be stored in application containers in an OS-neutral format in an applications store. However, as further discussed below, the data associated with such captured applications 258 may not actually be copied to applications portion 260, and is therefore not included in the desktop image 262.

Suppose that a new guest OS is to be created for a new user that has joined an organization. The user is given a list of applications that are available to be installed in the user's custom virtual desktop (e.g., via access to an application store). Each application, for example, can be stored in a separate application container in the application storage. Also, in some embodiments, multiple operating system choices may be available through an OS store as previously discussed. The user chooses which applications and/or operating system should be included in the virtual desktop.

To begin the process of generating desktop image 262 for the user, in one embodiment, the virtual desktop management application creates and mounts a read-only layer as primary virtual disk 252 that references a master OS image in the OS store. The primary virtual disk 252 forms the base guest OS that runs in the virtual desktop.

One or more captured applications 258 selected by the user, for example, can further be added to the virtual desktop. The virtual desktop management application generates metadata relating to each captured application 258 in order to provide the file system of the guest OS 208 the impression that captured applications 258 are stored in applications portion 260 of desktop image 262. The metadata includes, for example, information about which file system data blocks would presumably store the data associated with a captured application 258 (e.g., in one embodiment, such metadata being manifested as modifications to the file system's data block bitmaps, etc.). The metadata may also include file descriptor, inodes or other similar data structure entries used by the file system to identify particular file system data blocks corresponding to particular application files, as well as attributes associated with such file descriptors, such as file size, timestamps, and security information. The virtual desktop management application then adds such metadata to applications portion 260 of desktop image 262 (i.e., in a location in desktop image 262 that would be accessed by the file system to obtain such metadata for files).

By generating such metadata, the virtual desktop management application provides to the guest OS 208 the perception that captured applications 258 are actually stored in the file system of guest OS 208 rather than being accessed at runtime from an application container stored at an application store, as previously discussed. As should be recognized, the generation and incorporation of the metadata by the virtual desktop management application into the desktop image 262 only reserves blocks of the file system and does not actually copy the application data into the reserved file system blocks, as would typically be performed when the virtual desktop management application composes a desktop image. The reserved data blocks represent the amount of space that the application data would have used had the application data been actually copied to the virtual disk 220.

In addition, as previously mentioned, the virtual desktop management application creates mapping table 230 for use by block driver 228 in hypervisor 214 during execution of virtual machine 203 running from desktop image 262 that maps the file system data blocks reserved for the applications in applications portion 260 and the actual data blocks in the application containers that, for example, are stored in an application store in networked storage in a location different from virtual disk 220.

Since the applications are not actually copied in applications portion 260, applications portion 260 can be small in size, relative to prior art techniques. For example, in conventional desktop virtualization techniques, as more applications are installed on the individual virtual desktops, there would be duplication of data due to multiple copies of applications installed on different desktops. This results in relatively high disk usage. According to embodiments described herein, the disk requirements provided are lower compared to prior art techniques since a single copy of the data blocks associated with an application is maintained in application containers, instead of a separate copy in each virtual disk 220, thereby providing data de-duplication.

Since each user/VM may select different applications for installation in the virtual desktop, and since the applications can be populated in mapping table 230 in a different order for each user/VM, in one embodiment, the virtual desktop management application generates a separate mapping table 230 for each virtual disk 220 that is provided to hypervisor 214 for use when the user's virtual desktop is running in a virtual machine 203 supported by hypervisor 214. For example, upon receiving a read request from a virtual machine $203_A$ running a virtual desktop, hypervisor 214 (e.g., the VMM $204_A$ associated with virtual machine $203_A$) locates the corresponding mapping table 230 generated by the virtual desktop management application during the offline phase that corresponds to the particular virtual desktop. In one embodiment, each mapping table 230 may be identified by the computer identity that is added to applications portion 260 of desktop image 262 of virtual disk 220, as previously discussed.

In one embodiment utilizing an NTFS file system, guest OS 208 creates and updates file records in a MFT (Master File Table) for files that are being copied to the system executing the virtual desktop. However, as previously discussed with respect to selected applications available as application containers in the application store, the virtual desktop management application, during the offline phase, creates file records in the MFT for such application containers and generates mapping table 230 that is used by hypervisor 214 during runtime for such application containers since they are not actually copied into the NTFS file system stored in desktop image 262. Most modern day file systems, including NTFS, have several optimizations. These optimizations handle certain cases intelligently when a read request is issued by an application. For example, instead of actually sending the requests down to the block layer, the NTFS itself may satisfy some of the read requests. However, as described, certain embodiments work by re-mapping some of the data blocks at the level of hypervisor 214, not NTFS in guest OS 208 of desktop image 262. Accordingly, since such embodiments provide mapping table 208 for use at the level of hypervisor 214, native file system optimizations may need to be bypassed. More specifically, since embodiments work at the block layer, the process of creating and updating the file records in the MFT should ensure that any read request for these file records reach the block layer, and ultimately hypervisor 214.

Figure 3:
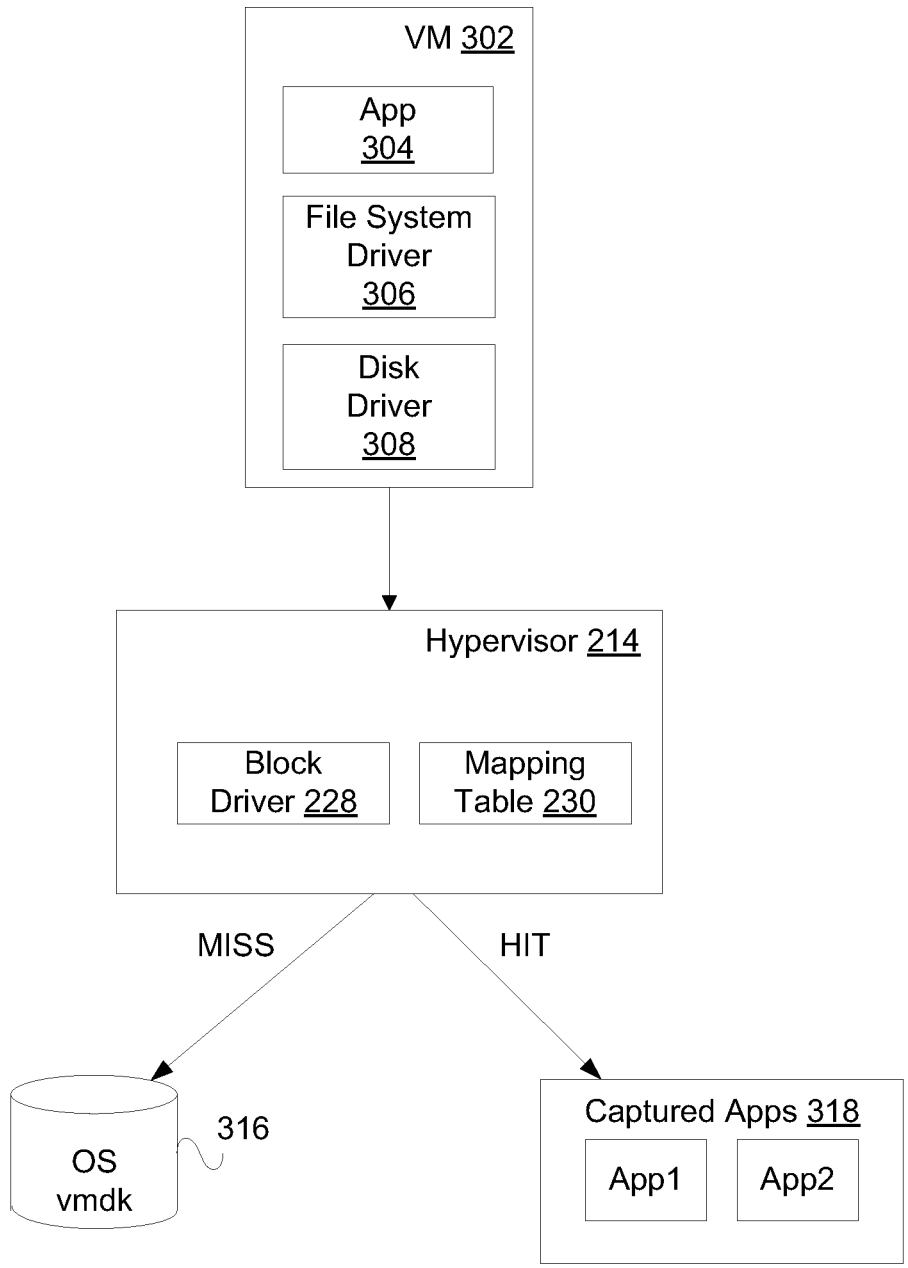
FIG. 3 is a conceptual diagram of running a virtual desktop utilizing a desktop image, according to one embodiment.

FIG. 3 is a conceptual diagram of running a virtual desktop utilizing a desktop image, according to one embodiment. When VM 203 utilizes desktop image 262 composed from an offline phase as discussed herein, the applications are visible to guest OS 208 of VM 203 as a result of the metadata created and added to applications portion 260 of desktop image 262 in the offline phase. When a read request is generated by an application 304 in the guest OS 208, the read request is passed to a file system driver 306, which in turn passes the request to a disk driver 308 (or virtual HBA 212 to access virtual disk 220, as previously discussed). Disk driver 308 or virtual HBA 212 then ultimately passes the request to the block driver 228 in VMM 204 of hypervisor 214 (e.g., host bus emulator 213 as previously discussed).

For example, the read request received by block driver 228 may specify a start block number and a number of blocks to read. Block driver 228 then looks up a location of the data referenced in the read request in mapping table 230 that was formed during the offline phase for desktop image 262, as described in the context of FIG. 2. If block driver 228 finds a match for the start block number in the mapping table 230 (i.e., a "hit"), those blocks of data are fetched from the locations specified by mapping table 230, namely from the application containers 318 stored at an application store, for example. On the other hand, if the lookup does not find a match in the mapping table 230 (i.e., a "miss"), the blocks are fetched from virtual disk file 316 based on the actual block number of the read request within desktop image 262, which, for example, can be stored in a VMDK (Virtual Machine Disk Format) file format promulgated by VMware, Inc. (although it should be recognized that any virtual disk file format may be utilized to store desktop image 262).

As described herein, the desktop image 262 may be considered to be generated more efficiently than using prior art techniques. As described, primary virtual disk 252 can be maintained as a read-only layer that references a master OS image from an OS store and the applications are not actually copied into desktop image 262, but are rather referenced via metadata in the file system and accessed by hypervisor 214 via application containers stored in an application store. Accordingly, the offline phase of generating desktop image 262, as previously discussed, may be faster (and more efficient from a storage perspective) when compared to prior art approaches that generate desktop images by actually copying and installing applications into the desktop image (as well as possibly copying the master OS image into primary virtual disk 252 as well).

Additionally, in some embodiments, when VM 203 is shutdown, desktop image 262 is queued for analysis by the virtual desktop management application. In an embodiment where applications portion 260 is implemented as a delta disk, such analysis may be performed only on applications portion 260 since primary virtual disk 252, as a read-only layer to a master OS image, would not change. It should be recognized, however, the changes made to an existing virtual desktop by a user during use of the virtual desktop may be stored in a variety of ways. For example, in an alternative embodiment, any changes made by the user of the virtual desktop may be added yet another delta desk on top of applications portion 260. By performing a post-shutdown analysis, the virtual desktop management application becomes aware of any user changes, such as user changes to settings, configurations, files, etc. as well as new user-installed applications. The new user changes may be merged into user profile information 256, and any applications that were newly installed by the user are analyzed by the virtual desktop management application. The new applications can then be stored in application containers, for example, in the application store. When the new application data is extracted and corresponding application containers are created (or otherwise already exist) in the application store, the virtual desktop management application regenerates or otherwise modifies applications portion 260 (e.g., to remove the new applications added by the user, add metadata for the new application containers, etc.). and update the mapping table 230 to incorporate references to application containers for the new applications into the desktop image 262.

Operation in one embodiment is described below. For example, during running of the virtual desktop, an application running on top of guest OS 208 requests the opening of a file in the file system, such as "foo.txt." As previously discussed in the context of FIG. 3, such a request reaches a file system driver 306 in guest OS 208, which determines the data blocks in the file system of the guest OS 208 that purportedly contain the file by accessing metadata available to the file system, such a file descriptors and file system bitmaps. File system driver 306 then requests a storage driver in the guest OS 208 (e.g., disk driver 308 as previously discussed in the context of FIG. 3 or a host bust adapter such as HBA 212 in FIG. 2 to access networked storage) to issue a corresponding disk read for retrieving the file data. Since the virtual desktop is a virtual machine 203 running on hypervisor 214, the disk read is ultimately routed to block driver 228 in hypervisor 214 for retrieving file data. Block driver 228, which is completely outside of guest OS 208, receives the disk read request and performs a lookup in mapping table 230 that was generated particularly for the virtual machine 203 during the offline composition phase. If mapping table 230 does not have an entry corresponding to the data blocks of the disk read request, then the data is stored in the desktop image 262 itself, and hypervisor 214 accesses the data from virtual disk 220 itself (i.e., which contains desktop image 262). However, if mapping table 230 does have an entry corresponding to the received disk read request, then the data is resides in an application container stored in the application store and block driver 228 translates the read request to fetch the data from such application container.

Figure 4:
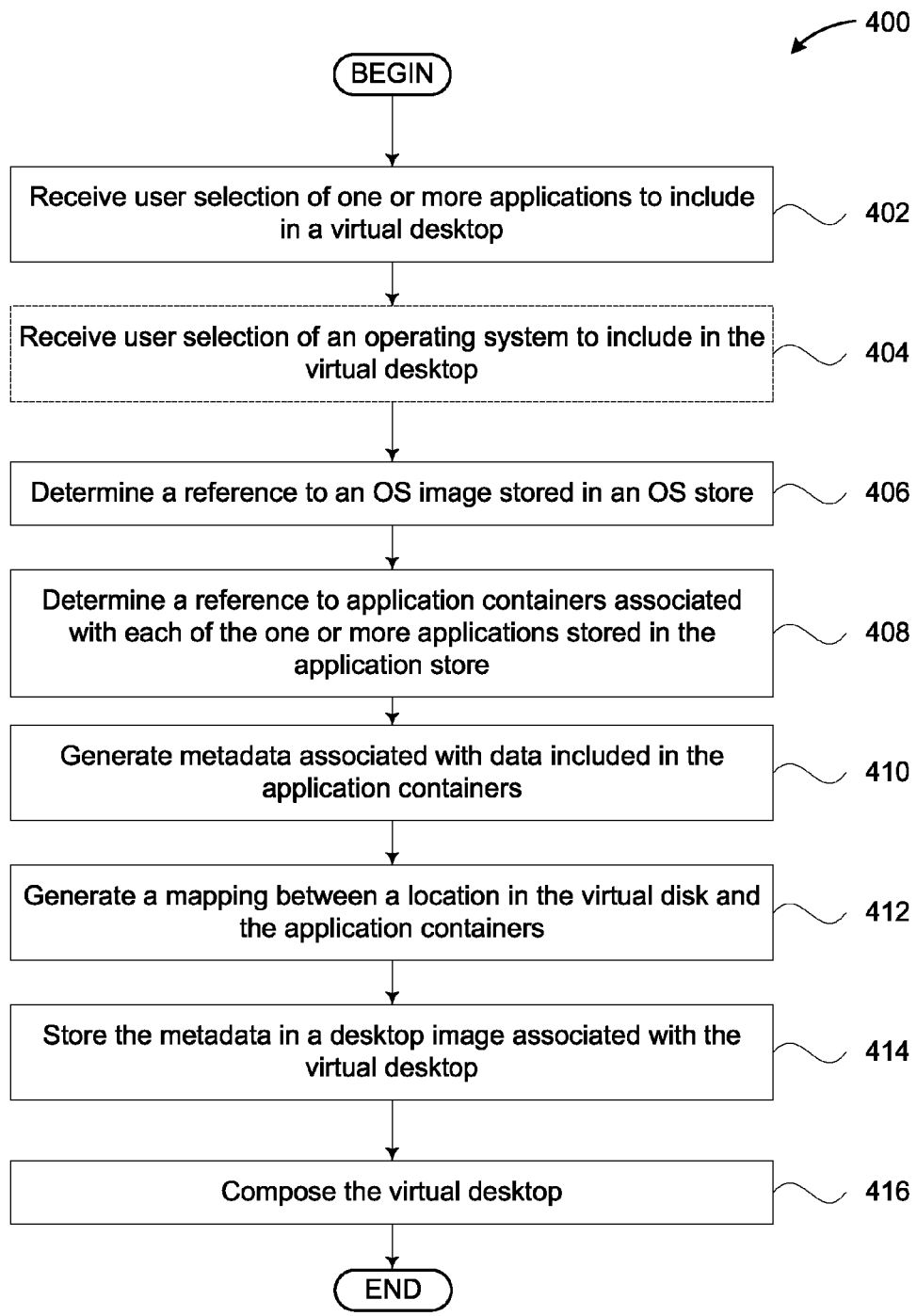
FIG. 4 is a flow diagram of method steps for offline desktop composition, according to one embodiment.

FIG. 4 is a flow diagram of method steps for offline desktop composition, according to one embodiment. It should be understood that, even though the method 400 is described in conjunction with the systems of FIGS. 1A-3, any system consistent with the teachings herein may be configured to perform the method steps.

As shown, the method 400 begins at step 402, where a virtual desktop management application receives a user selection of one or more applications to include in a virtual desktop. At step 404, the virtual desktop management application receives user selection of an operating system to include in the virtual desktop. In some embodiments, step 404 is optional, as indicated by the dashed lines around step 404. For example, a single OS option may be available, as decided by a system administrator.

At step 406, the virtual desktop management application determines a reference to an operating system (OS) image stored in an OS store. As described above, in one embodiment, a "master" image of the OS available in an OS store in networked storage can serve as the basis for a read-only layer that makes up primary virtual disk 252 of desktop image 262. In one embodiment, the reference is a pointer to the location of the OS image in the OS store.

At step 408, the virtual desktop management application determines a reference to one or more application containers associated with each of the one or more applications stored in an application store. In one embodiment, the references comprise pointers to the location of the application containers in the application store. As described, each application is stored in an OS-neutral format in a separate application container. The application containers can be stored in networked storage accessible by a host computer configured to run the one or more virtual machines.

At step 410, the virtual desktop management application generates metadata associated with data included in the application containers. As previously discussed, such metadata provides information (e.g., file descriptors, modifications to file system data block bitmaps, etc.) to the file system of guest OS 208 to create a perception by the file system that the data associated with the applications are actually stored in desktop image 262.

At step 412, the virtual desktop management application generates a mapping between a purported location in the virtual disk 220 where the application data is perceived to be stored and the actual location where the application data is stored in the application containers stored in the storage network, e.g., in the application store rather than in virtual disk 220 itself. In one embodiment, the mapping is stored as mapping table 230. At step 414, the virtual desktop management application stores the metadata in desktop image 262. At step 416, the virtual desktop management application composes the virtual desktop. When a user logs-on to the virtual desktop, a full-feature OS and one or more full-feature applications are available to the user, as if the OS and applications are actually installed on virtual disk 220.

Figure 5:
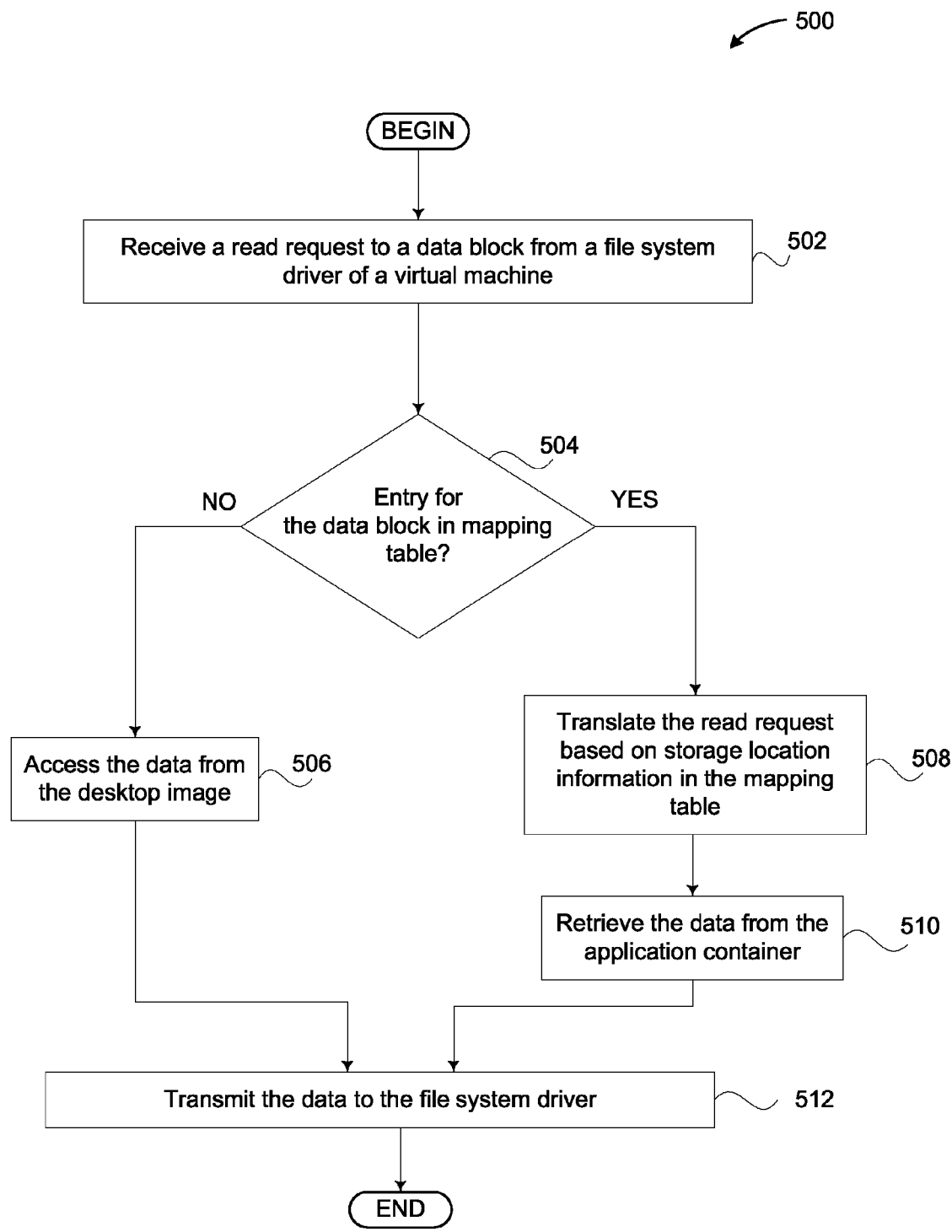
FIG. 5 is a flow diagram of method steps for running a virtual desktop utilizing a desktop image, according to one embodiment.

FIG. 5 is a flow diagram of method steps for running a virtual desktop utilizing a desktop image, according to one embodiment. It should be understood that, even though the method 500 is described in conjunction with the systems of FIGS. 1A-3, any system consistent with the teachings herein may be configured to perform the method steps.

As shown, the method 500 begins at step 502, where block driver 228 included in hypervisor 214 ultimately receives a read request to a data block from file system driver 306 of a virtual machine 203 based on virtual desktop image 262. At step 504, block driver 228 performs a look-up in mapping table 230 to determine whether the mapping table 230 includes an entry for the data block. If block driver 228 determines that there is no entry in mapping table 230 for the data block, then the data block resides in disk image 262 itself and the method 500 proceeds to step 506, where a disk driver (e.g., VMFS driver 216) accesses the data from desktop image 262. Method 500 proceeds to step 512, described below.

However, if block driver 228 determines that there is an entry in mapping table 230 for the data block, then the method 500 proceeds to step 508, where block driver 228 translates the read request based on storage location information in mapping table 230. At step 510, the disk driver (e.g., VMFS driver 216) accesses the data from the application container. At step 512, the block driver 228 transmits the data to the file system driver 306 in guest OS 208 that requested the data. The process running in guest OS 208 that requested the data then continues executing using the data.

Figure 6:
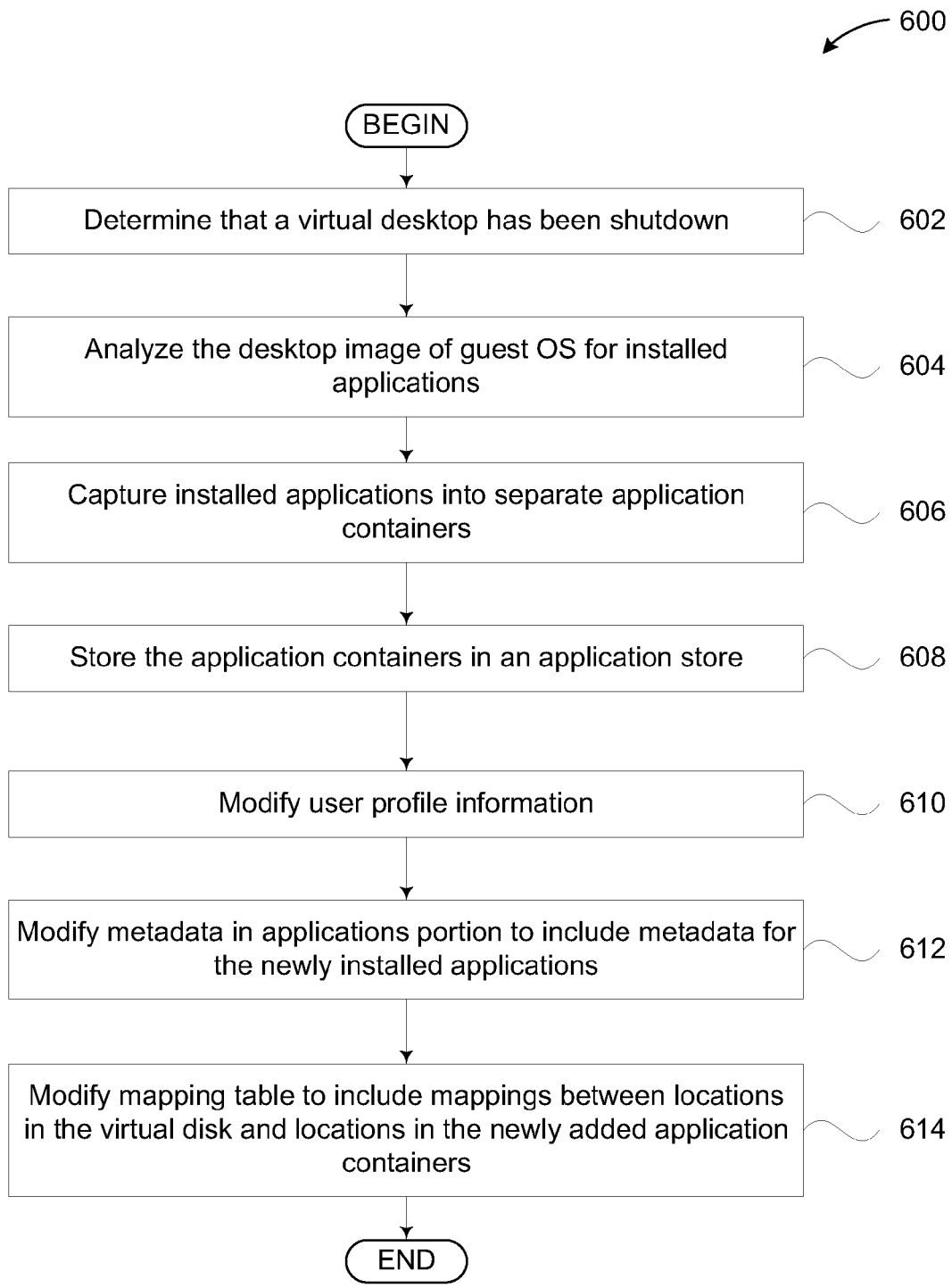
FIG. 6 is a flow diagram of method steps for offline desktop composition after a user has installed an additional application, according to one embodiment.

FIG. 6 is a flow diagram of method steps for offline desktop composition after a user has installed an additional application, according to one embodiment. It should be understood that, even though the method 600 is described in conjunction with the systems of FIGS. 1A-3, any system consistent with the teachings herein may be configured to perform the method steps.

As shown, the method 600 begins at step 602, where the virtual desktop management application determines that a virtual desktop has been shutdown. For example, the virtual desktop management application can monitor or otherwise be configured to receive a signal when a user logs-off from VM 203 that is running the virtual desktop.

At step 604, the virtual desktop management application analyzes the desktop image 262 (e.g., registry, file system, configurations, etc.) of guest OS 208 to determine new user changes as well as newly installed applications. For example, in some cases, the user may have installed a new application while working in the virtual desktop. At step 606, the virtual desktop management application captures the installed applications into separate application containers (e.g., to the extent such newly installed applications have not already been captured into application containers). As described, in one embodiment, capturing an application includes encapsulating the application an OS-neutral format. At step 608, the virtual desktop management application stores the application containers in an application store.

At step 610, the virtual desktop management application may modify user profile information 256 to incorporate any new user changes. In step 612, the virtual desktop management application modifies metadata in applications portion 260 to include metadata for the newly installed applications by the user (and correspondingly removes any files and settings corresponding to such newly added applications that were added to applications portion 260, or any other portion of desktop image 262, during the user session). At step 614, the virtual desktop management application modifies mapping table 230 for the virtual disk 220 to include mappings between purported location of the data associated with the newly installed applications in the virtual disk 220 where the data is perceived to be stored and the actual storage locations (e.g., in the application store) for the data residing in the newly added application containers. While the embodiment of FIG. 6 describes a "modification to" pre-existing user profile information 256, file system metadata in applications portion 260, and mapping table 230 to incorporate new user changes and newly installed applications, it should be recognized that alternative embodiments may regenerate applications portion 260 and mapping table 230 in their entirety rather than attempt to modify mapping table 230 and the aforementioned components of applications portion 260.

In sum, embodiments provide a technique to dynamically compose virtual desktops associated with one or more applications in a virtualized computing environment, yet retain the ability to apply changes to each component of the virtual desktop independent of the other components. Embodiments populate metadata of a desktop image and allocate blocks for the application data, but do not actually copy any of the application data into the allocated blocks. Instead, embodiments build a mapping table between disk block numbers and the actual data, which can be stored in a separate application store that is different from the virtual desktop image itself. By providing these features, the techniques according to one or more embodiments solve the efficiency issues of current VDI adoption techniques. For example, in one scenario, an image for a new version of a guest OS 208 can replace a prior image for primary virtual disk 252, and application portion 260 can be efficiently regenerated and layered on top of primary virtual disk 252 in accordance with the teachings herein, thereby addressing prior difficulties in upgrading the guest OS for virtual disks.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of embodiments described herein. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for generating a virtual desktop for a client computing device, the method comprising:

receiving a user selection of one or more applications to include in the virtual desktop, the virtual desktop running in a virtual machine that includes a virtual disk and is executed in a physical computer system;

determining references to application containers associated with each of the one or more applications, each of the application containers including one of the applications and application data associated therewith;

generating metadata associated with the application data included in the application containers, the metadata indicating that data blocks containing the application data are reserved and not stored in the virtual disk, and are stored in the application containers;

generating a mapping between the data blocks of the application data that are reserved in the virtual disk and the data blocks of the application data stored in the application containers; and enabling access to the mapping by the hypervisor when running the virtual desktop in the virtual machine.

2. The method of claim 1, further comprising:

receiving a selection of an operating system to include in the virtual desktop; and determining a reference to an image of the operating system stored in an operating system store accessible by the hypervisor.

3. The method of claim 1, further comprising:

determining that the virtual machine has been shutdown;

determining that applications have been installed in the virtual machine;

capturing each installed application into a separate application container;

modifying metadata pertaining to application data of each installed application to indicate that data blocks containing the application data are reserved and not stored in the virtual disk, and are stored in the respective application container; and generating respective mappings between the data blocks of the application data that are reserved in the virtual disk and the data blocks of the application data stored in the respective application containers.

4. The method of claim 1, wherein the virtual desktop further includes user profile information and/or operating system customizations associated with the virtual machine running the virtual desktop.

5. The method of claim 1, further comprising:

in response to receiving a read request for a data block of the application data, determining whether the data block is stored in the virtual desktop or in one of the application containers;

when the data block is stored in one of the application containers, translating the read request based on the mapping and causing the data block to be retrieved from said one of the application containers; and when the data block is stored in the virtual disk, causing the data block to be retrieved from the virtual disk.

6. The method of claim 5, wherein the mapping includes information associated with a location of the data blocks of the application data stored in the application container.

7. The method of claim 5, wherein the mapping is associated with a virtual desktop that generated the read request.

8. A non-transitory computer-readable storage medium comprising instructions that, when executed in a computing device, enable a technique for generating a virtual desktop for a client computing device, by performing the steps of:

receiving a user selection of one or more applications to include in the virtual desktop, the virtual desktop running in a virtual machine that includes a virtual disk and is executed in a physical computer system;

determining references to application containers associated with each of the one or more applications, each of the application containers including one of the applications and application data associated therewith;

generating metadata associated with the application data included in the application containers, the metadata indicating that blocks containing the application data are reserved and not stored in the virtual disk, and are stored in the application containers;

generating a mapping between the data blocks of the application data that are reserved in the virtual disk and the data blocks of the application data stored in the application containers; and enabling access to the mapping by the hypervisor when running the virtual desktop in the virtual machine.

9. The computer-readable storage medium of claim 8, further comprising instructions for:

receiving a selection of an operating system to include in the virtual desktop; and determining a reference to an image of the operating system stored in an operating system store accessible by the hypervisor.

10. The computer-readable storage medium of claim 8, further comprising instructions for:

determining that the virtual machine has been shutdown;

determining that applications have been installed in the virtual machine;

capturing each installed application into a separate application container;

modifying metadata pertaining to application data of each installed application to indicate that data blocks containing the application data are reserved and not stored in the virtual disk, and are stored in the respective application container; and generating respective mappings between the data blocks of the application data that are reserved in the virtual disk and the data blocks of the application data stored in the respective application containers.

11. The computer-readable storage medium of claim 8, wherein the virtual desktop further includes user profile information and/or operating system customizations associated with the virtual machine running the virtual desktop.

12. The computer-readable storage medium of claim 8, further comprising instructions for:

in response to receiving a read request for a data block of the application data, determining whether the data block is stored in the virtual desktop or in one of the application containers;

when the data block is stored in one of the application containers, translating the read request based on the mapping and causing the data block to be retrieved from said one of the application containers; and when the data block is stored in the virtual disk, causing the data block to be retrieved from the virtual disk.

13. The computer-readable storage medium of claim 12, wherein the mapping includes information associated with a location of the data blocks of the application data stored in the application container.

14. The computer-readable storage medium of claim 12, wherein the mapping is associated with a virtual desktop that generated the read request.

* * * * *